United States Patent
Liversage et al.

(10) Patent No.: US 11,969,860 B2
(45) Date of Patent: Apr. 30, 2024

(54) POLYCRYSTALLINE DIAMOND

(71) Applicants: Element Six Limited, Clare (IE); Baker Hughes Incorporated, Houston, TX (US)

(72) Inventors: John Hewitt Liversage, Springs (ZA); Danny Eugene Scott, Houston, TX (US); Humphrey Samkelo Lungisani Sithebe, Springs (ZA); Kaveshini Naidoo, Springs (ZA); Bronwyn Annette Kaiser, Springs (ZA); Michael Lester Fish, Springs (ZA)

(73) Assignees: Element Six Limited, Oxfordshire (GB); Baker Hughes Incorporated, Houston, TX (US)

( * ) Notice: Subject to any disclaimer, the term of this patent is extended or adjusted under 35 U.S.C. 154(b) by 0 days.

(21) Appl. No.: 17/946,247

(22) Filed: Sep. 16, 2022

(65) Prior Publication Data
US 2023/0011321 A1 Jan. 12, 2023

Related U.S. Application Data (63) Continuation of application No. 16/733,099, filed on Jan. 2, 2020, now abandoned, which is a continuation
(Continued)

(30) Foreign Application Priority Data

Mar. 6, 2009 (GB) ..................................... 0903822
Mar. 6, 2009 (GB) ..................................... 0903834

(51) Int. Cl.
*E21B 10/573* (2006.01)
*B24D 18/00* (2006.01)
(Continued)

(52) U.S. Cl.
CPC ..... *B24D 18/0027* (2013.01); *B24D 18/0009* (2013.01); *C04B 35/52* (2013.01);
(Continued)

(58) Field of Classification Search
CPC ....... E21B 10/46; E21B 10/56; E21B 10/5735
See application file for complete search history.

(56) References Cited

U.S. PATENT DOCUMENTS 3,743,489 A 7/1973 Wentorf, Jr. et al.
3,745,623 A 7/1973 Wentorf, Jr. et al.
(Continued)

FOREIGN PATENT DOCUMENTS

EP 0374424 11/1995
GB 2408735 8/2005
(Continued)

*Primary Examiner* — Pegah Parvini
(74) *Attorney, Agent, or Firm* — Bryan Cave Leighton Paisner LLP (57) ABSTRACT

An embodiment of a PCD insert comprises an embodiment of a PCD element joined to a cemented carbide substrate at an interface. The PCD element has internal diamond surfaces defining interstices between them. The PCD element comprises a masked or passivated region and an unmasked or unpassivated region, the unmasked or unpassivated region defining a boundary with the substrate, the boundary being the interface. At least some of the internal diamond surfaces of the masked or passivated region contact a mask or passivation medium, and some or all of the interstices of the masked or passivated region and of the unmasked or unpassivated region are at least partially filled with an infiltrant material.

11 Claims, 6 Drawing Sheets

Related U.S. Application Data of application No. 15/052,481, filed on Feb. 24, 2016, now abandoned, which is a continuation of application No. 13/254,643, filed as application No. PCT/IB2010/050975 on Mar. 8, 2010, now Pat. No. 9,297,213.

(51) Int. Cl.
    *C04B 35/52*     (2006.01)
    *C04B 35/63*     (2006.01)
    *C04B 35/645*     (2006.01)
    *C04B 37/02*     (2006.01)
    *C04B 41/45*     (2006.01)
    *C04B 41/81*     (2006.01)
    *C04B 41/88*     (2006.01)
    *C22C 26/00*     (2006.01)
    *E21B 10/56*     (2006.01)
    *B22F 5/00*     (2006.01)

(52) U.S. Cl.
    CPC ........ *C04B 35/6316* (2013.01); *C04B 35/645* (2013.01); *C04B 37/021* (2013.01); *C04B 41/4523* (2013.01); *C04B 41/4529* (2013.01); *C04B 41/81* (2013.01); *C04B 41/88* (2013.01); *C22C 26/00* (2013.01); *E21B 10/56* (2013.01); *E21B 10/5735* (2013.01); *B22F 2005/001* (2013.01); *B22F 2999/00* (2013.01); *C04B 2235/3817* (2013.01); *C04B 2235/3826* (2013.01); *C04B 2235/402* (2013.01); *C04B 2235/428* (2013.01); *C04B 2235/616* (2013.01); *C04B 2235/656* (2013.01); *C04B 2235/6567* (2013.01); *C04B 2235/783* (2013.01); *C04B 2235/786* (2013.01); *C04B 2235/80* (2013.01); *C04B 2237/363* (2013.01); *C04B 2237/401* (2013.01); *C04B 2237/60* (2013.01); *C04B 2237/61* (2013.01)

(56) References Cited

U.S. PATENT DOCUMENTS

| | | |
|---|---|---|
| 3,767,371 A | 10/1973 | Wentorf, Jr. et al. |
| 4,224,380 A | 9/1980 | Bovenkerk et al. |
| 4,288,248 A | 9/1981 | Bovenkerk et al. |
| 4,944,772 A | 7/1990 | Cho |
| 5,049,164 A * | 9/1991 | Horton ............. C04B 41/52 51/293 |
| 5,096,465 A | 3/1992 | Chen et al. |
| 5,127,923 A | 7/1992 | Bunting et al. |
| 5,151,107 A | 9/1992 | Cho et al. |
| 6,544,308 B2 | 4/2003 | Griffin et al. |
| 6,562,462 B2 | 5/2003 | Griffin et al. |
| 7,473,287 B2 | 1/2009 | Belnap et al. |
| 7,487,849 B2 | 2/2009 | Radtke |
| 7,635,035 B1 | 12/2009 | Bertagnolli et al. |
| 7,704,553 B2 | 4/2010 | Watson et al. |
| 7,726,421 B2 | 6/2010 | Middlemiss |
| 7,972,395 B1 | 7/2011 | Dadson |
| 8,071,173 B1 * | 12/2011 | Sani ............. B24D 3/10 428/688 |
| 8,377,157 B1 | 2/2013 | Dadson |
| 2004/0194689 A1 | 10/2004 | Sung |
| 2005/0115744 A1 | 6/2005 | Griffin et al. |
| 2007/0079994 A1 * | 4/2007 | Middlemiss ......... C04B 35/645 175/426 |
| 2008/0115421 A1 | 5/2008 | Sani |
| 2008/0142276 A1 | 6/2008 | Griffo et al. |
| 2008/0185189 A1 | 8/2008 | Griffo et al. |
| 2008/0223621 A1 | 9/2008 | Middlemiss et al. |
| 2008/0223623 A1 | 9/2008 | Keshavan et al. |
| 2008/0230280 A1 | 9/2008 | Keshavan et al. |
| 2009/0090563 A1 | 4/2009 | Voronin et al. |
| 2009/0114454 A1 | 5/2009 | Belnap et al. |
| 2009/0152018 A1 | 6/2009 | Sani |
| 2009/0173015 A1 | 7/2009 | Keshavan et al. |
| 2009/0173547 A1 | 7/2009 | Voronin et al. |
| 2009/0178855 A1 | 7/2009 | Zhang et al. |
| 2009/0183925 A1 | 7/2009 | Zhang et al. |
| 2009/0324873 A1 | 12/2009 | Weis et al. |
| 2010/0012389 A1 | 1/2010 | Zhang et al. |
| 2010/0095602 A1 | 4/2010 | Belnap et al. |
| 2011/0083908 A1 | 4/2011 | Shen et al. |

FOREIGN PATENT DOCUMENTS

| | | |
|---|---|---|
| GB | 2427215 | 12/2006 |
| JP | 59219500 | 12/1984 |
| WO | 2004004954 | 1/2004 |
| WO | 2008062370 | 5/2008 |
| WO | 2008074010 | 6/2008 |

* cited by examiner

POLYCRYSTALLINE DIAMOND

CROSS-REFERENCE TO RELATED APPLICATIONS

This application is a continuation of U.S. application Ser. No. 16/733,099, filed Jan. 2, 2020, which is a continuation of U.S. application Ser. No. 15/052,481, filed Feb. 24, 2016 which is a continuation of U.S. application Ser. No. 13/254,643 filed Nov. 10, 2011, which is a § 371 filing from PCT Application PCT/IB2010/050975 filed Mar. 8, 2010, which claims priority to GB Application No. 0903822.5 filed Mar. 6, 2009 and to GB Application No. 0903834.0 filed Mar. 6, 2009, each of which are hereby incorporated by reference in their entirety.

FIELD

This invention relates to polycrystalline diamond (PCD) elements, bodies and tool inserts, particularly for use in tools for boring into the earth, and to a method for making PCD elements.

BACKGROUND

Cutter inserts for drill bits for use in boring into the earth may comprise a layer of polycrystalline diamond (PCD) bonded to a cemented carbide substrate. Such cutter inserts may be referred to as polycrystalline diamond compacts (PDC).

PCD is an example of a superhard, also called superabrasive, material comprising a mass of substantially inter-grown diamond grains, forming a skeletal mass defining interstices between the diamond grains. PCD material comprises at least about 80 volume % of diamond and may be made by subjecting an aggregated mass of diamond grains to an ultra-high pressure of greater than about 5 GPa and temperature of at least about 1,200 degrees centigrade in the presence of a sintering aid.

Suitable sintering aids for PCD may also be referred to as a catalyst material for diamond. Catalyst material for diamond is understood to be material that is capable of promoting direct inter-growth of diamond grains at a pressure and temperature condition at which diamond is thermodynamically more stable than graphite. Some catalyst materials for diamond may promote the conversion of diamond to graphite at ambient pressure, particularly at elevated temperatures. Examples of catalyst materials for diamond are cobalt, iron, nickel and certain alloys including any of these. PCD may be formed on a cobalt-cemented tungsten carbide substrate, which may provide a source of cobalt catalyst material for the PCD. The interstices with PCD may be at least partly be filled with a material, which may be referred to as a binder or a filler material. In particular the interstices may be wholly or partially filled with catalyst material for diamond.

Components comprising PCD are used in a wide variety of tools for cutting, machining, drilling or degrading hard or abrasive materials such as rock, metal, ceramics, composites and wood-containing materials. For example, PCD bodies are commonly used as cutter inserts on drill bits used for boring into the earth in the oil and gas drilling industry. PCD bodies are also used for machining and milling metal-containing bodies, such as may be used in the auto manufacturing industry. In many of these applications the temperature of the PCD material becomes elevated as it engages a rock formation, workpiece or body with high energy.

PCD is extremely hard and abrasion resistant, which is the reason it is the preferred tool material in some of the most extreme machining and drilling conditions, and where high productivity is required. A disadvantage of PCD containing certain catalyst materials for diamond as a filler material may be its relatively poor thermal stability above about 400 degrees centigrade. The catalyst material may promote the degradation of the PCD at elevated temperature, particularly at temperatures greater than about 750 degrees centigrade, as may be experienced in manufacture and use of PCD compacts.

U.S. Pat. No. 7,377,341 discloses thermally stable ultra-hard compact constructions comprising a body formed from an ultra-hard material such as PCD, including a thermally stable region positioned adjacent a working surface of the body. The ultra-hard material body can be attached to a desired substrate, thereby forming a compact, and an intermediate material can be interposed between the substrate and the body. The intermediate material may be one that does not infiltrate into the ultra-hard material body during high pressure/high temperature processing and that can operate as a barrier to prevent migration of constituent materials from the substrate to the ultra-hard material body.

U.S. Pat. No. 7,473,287 discloses thermally-stable polycrystalline diamond materials comprising a first material phase that includes a plurality of bonded together diamond crystals, and a second material phase that includes a reaction product formed between a binder/catalyst material used to facilitate diamond crystal bonding and a material that is reactive with the binder/catalyst material. A barrier layer may be placed between PCD material and a substrate to prevent unwanted infiltration of extra cobalt therein which could adversely impact the thermal stability of the resultant PCD material.

United States patent application publication number 2007/0079994 discloses thermally stable diamond-bonded compacts that include a diamond-bonded body comprising a thermally stable region that extends a distance below a diamond-bonded body surface. The thermally stable region has a material microstructure comprising a matrix first phase of bonded together diamond crystals, and a second phase interposed within the matrix first phase. The second phase comprises one or more reaction products formed between one or more infiltrant material and the diamond crystals at high pressure/high temperature (HPHT) conditions. The infiltrant or replacement material may include one or more of the following elements: Si, Cu, Sn, Zn, Ag, Au, Ti, Cd, Al, Mg, Ga, Ge, which may also be used in compounds containing conventional solvent-catalyst materials (transition metals) where the solvent catalyst is rendered inactive by reaction with another material.

United States patent application publication number 2008/0115421 discloses a method of fabricating a superabrasive article, in which at least a portion of interstitial regions of a pre-sintered-polycrystalline-diamond body may be infiltrated with silicon from a silicon-containing material. At least a portion of metal-solvent catalyst located within the at least a portion of interstitial regions of the pre-sintered-polycrystalline-diamond body may be displaced into a porous mass. The silicon and the pre-sintered-polycrystalline-diamond body are reacted to form silicon carbide within the at least a portion of the interstitial regions.

There is a need to provide a polycrystalline diamond (PCD) element having enhanced thermal stability. There is also a need to provide a PCD element having enhanced thermal stability combined with enhanced resistance to fracture.

SUMMARY

A purpose of the invention is to provide a polycrystalline diamond (PCD) element having enhanced thermal stability, and a further purpose of the invention is to provide a method for making same.

A first aspect of the invention provides a polycrystalline diamond (PCD) element having internal diamond surfaces, the internal diamond surfaces defining interstices between them; the PCD element comprising a masked or passivated region and an unmasked or unpassivated region, the unmasked or unpassivated region defining a boundary with another region or body, and extending a depth of between about 5 microns and about 600 microns from the boundary, in which at least some of the internal diamond surfaces of the masked or passivated region contact a mask or passivation medium, and wherein some or all of the interstices of the masked or passivated region and of the unmasked or unpassivated region are at least partially filled with an infiltrant material.

In one embodiment, the PCD element is bonded to a substrate at an interface and the unpassivated or unmasked region is adjacent the interface. In some embodiments, the boundary defined by the unmasked or unpassivated region is the interface between the PCD element and the substrate, the unmasked or unpassivated region extending a depth from the interface, the depth being at most about 400 microns, at most about 200 microns, at most about 100 microns, at most about 50 microns, at most about 10 microns or even at most about 5 microns. In some embodiments, the unmasked or unpassivated region extends a depth into the PCD element from the interface between the PCD element and the substrate, the depth being at least about 5 microns, at least about 10 microns, at least about 50 microns, at least about 100 microns, or even at least about 200 microns.

In one embodiment, at least some of the internal diamond surfaces of the masked or passivated region are coated with a mask or passivation medium.

In one embodiment, some or all of the interstices of the masked or passivated region and of the unmasked or unpassivated region are at least partially filled with an infiltrant material having substantially the same composition.

In one embodiment, the thermally stable region is proximate a peripheral surface of the PCD element. In one embodiment, the PCD element has a peripheral surface and a generally annular region adjacent the peripheral surface, at least part of the annular region being thermally stable and being masked or passivated.

In one embodiment, the infiltrant material comprises a catalyst material for diamond, and in one embodiment, the catalyst material comprises cobalt, iron or nickel, or an alloy including any of these elements. In one embodiment, the infiltrant comprises a material that is not a catalyst material for diamond, and in some embodiments the infiltrant material comprises silicon or aluminium.

In some embodiments, the mask or passivation medium comprises an inert salt, ceramic precursor material, organometallic precursor material or carbonaceous material. In some embodiments, the mask or passivation medium is a ceramic material selected from silicon carbide, titanium carbide, tantalum carbide, tungsten carbide, hafnium carbide, molybdenum carbide, zirconium carbide, vanadium carbide and aluminium carbide. In one embodiment, the mask or passivation medium, or at least a portion thereof, is formed by reaction of a mask or passivation precursor material and diamond from the internal diamond surfaces. In some embodiments, the mask or passivation precursor material comprises silicon, titanium, tantalum, tungsten, hafnium, molybdenum, zirconium, vanadium or aluminium. In some embodiments, remnants of the mask or passivation precursor material remain within interstices of the PCD element and may also function as mask or passivation media.

In some embodiments, the interstices within the masked or passivated region are least about 50 percent, at least about 70 percent, at least about 80 percent or even at least about 90 percent filled with silicon carbide or aluminium carbide.

In one embodiment, at least 40 percent of the total surface area of the internal diamond surfaces of the masked or passivated region is coated with the mask or passivation medium.

In one embodiment, the masked or passivated region is located adjacent a working surface or peripheral surface, or both, of the PCD element.

In some embodiments, the masked or passivated region extends a depth into the PCD element from a working surface, the depth being at most about 1,000 microns, at most about 500 microns or at most about 100 microns. In some embodiments, the masked or passivated region extends a depth into the PCD element from a working surface, the depth being at least about 5 microns, at least about 10 microns, at least about 50 microns, at least about 100 microns, or even at least about 200 microns.

In one embodiment, the thermally stable region is in the form of a stratum or layer. In some embodiments, the masked or passivated region is in the form of a layer or stratum that extends to a depth of at least about 40 microns, at least about 100 microns or even at least about 200 microns from a working surface.

Embodiments of the invention may have the advantage of enhanced thermal stability combined with enhanced resistance to fracture, which may result from reduced residual stresses.

In one embodiment, the infiltrant material is dispersed through at least some of the masked or passivated region and is chemically substantially isolated from and substantially unable to interact chemically with the PCD by the coated mask or passivation medium.

In one embodiment, the masked or passivated region and the thermally stable region overlap each other. In one embodiment, the masked or passivated region is contiguous with the thermally stable region of the PCD element.

In one embodiment, the PCD element comprises a thermally stable region that is separated from a region of the PCD element containing a catalyst material by a barrier, the barrier comprising a mask or passivation medium.

In one embodiment, the barrier is in the form of a stratum or layer.

In one embodiment, the PCD element is joined to a substrate and the region containing a catalyst material is adjacent the substrate.

In one embodiment, the porous region extends throughout the PCD element.

Embodiments of the invention have the advantage of enhanced thermal stability. Embodiments of the invention have the advantage of enhanced thermal stability and reduced internal stress, both of which alone or in combination may extend the working life of the PCD compact.

A second aspect of the invention provides a method for manufacturing a PCD element; the method including providing a PCD body having internal diamond surfaces, the internal diamond surfaces defining interstices, the PCD body containing a thermally stable region and a porous region, in which at least some of the interstices contain at least partly unfilled pores; introducing a mask or passivation medium proximate or into the thermally stable region; and introducing at least one infiltrant material into the porous region, the mask or passivation medium at least partly isolating diamond of the thermally stable region from chemical interaction with the at least one infiltrant material.

In one embodiment of the invention, a controlled temperature cycle is employed in such a manner as to allow sufficient or a certain amount of the mask or passivation medium or its precursor to be introduced proximate or into the thermally stable region prior to the at least one infiltrant material melting and infiltrating into the porous PCD body.

In one embodiment, the thermally stable region is at least partly porous, and in one embodiment, the porous region and the thermally stable region wholly or partially overlap, occupying a common volume within the PCD body. In one embodiment, the thermally stable region is at least partly porous and the method includes introducing the mask or passivation medium by filling part or the majority of the pores with the mask or passivation medium.

In one embodiment, the method includes introducing mask or passivation material into part or the majority of a porous region disposed adjacent a thermally stable region, the mask or passivation material functioning as a barrier to infiltrant material, and then introducing an infiltrant material into the PCD body; the mask or passivation materials preventing the infiltrant material from interacting with the thermally stable region.

In one embodiment, the method includes coating some or substantially all of the internal diamond surfaces of the thermally stable region, at least partially, with a mask or passivation medium such as an inert material in order to mask or passivate the thermally stable region, in whole or in part.

In one embodiment, the method includes substantially chemically isolating diamond from chemical interaction with the infiltrant material.

In one embodiment, the method includes introducing the infiltrant material into the polycrystalline diamond body simultaneously with introducing the mask or passivation medium proximate or into the thermally stable region. In one embodiment, the method includes introducing the mask or passivation medium proximate or into the thermally stable region and then introducing the infiltrant material into the polycrystalline diamond body. In one embodiment, the infiltrant material is introduced into a volume of the PCD body, the volume being at least 10 percent of the total volume of the PCD body.

In one embodiment, the polycrystalline diamond body is integrally bonded to a substrate, which may comprise a cemented carbide material, during the same step in which infiltrant material is introduced, and in one embodiment, the substrate provides the source of the infiltrant material, which may comprise cobalt.

In one embodiment, the PCD body is joined at an interface to a substrate comprising cemented tungsten carbide, and in one embodiment, the infiltrant material is introduced into a volume of the PCD body that is proximate a surface of the PCD body, the surface being remote from or opposing the interface, the volume having a depth from the surface of at least about 0.1 mm.

In one embodiment, the method includes removing catalyst material from interstices of a PCD body. In one embodiment, the thermally stable region is devoid or substantially devoid of catalyst material.

In one embodiment, the infiltrant material is a catalyst material. More preferably the infiltrant material comprises cobalt, iron or nickel, or an alloy including any of these elements.

In one embodiment, the method includes removing catalyst material from substantially the entire volume of the PCD body, thereby providing a thermally stable PCD body that is porous throughout.

Embodiments of the method of the invention have the advantage of permitting a PCD body to be infiltrated with a catalyst material without substantially reducing the thermal stability of the thermally stable region.

In an embodiment of the method in which the PCD body is joined to a substrate during the infiltration step, catalyst material such as cobalt within the substrate may infiltrate into pores within the PCD body, which may promote the formation of a strong bond between the PCD body and substrate.

Embodiments of the method of the invention have the advantage of producing PCD compacts having both enhanced thermal stability and reduced internal stress, which may extend the working life of the PCD compact. The infiltration of catalyst material to a depth within the PCD body may reduce the internal stress that may be generated when two bodies having very different thermo-mechanical properties are bonded together. Mere surface-to-surface bonding of a thermally stable diamond body to a cemented carbide substrate may result in significant thermo-mechanical stresses proximate the interface between them, which may lead to failure of the compacts both during manufacturing and in use, making such compacts uneconomical.

Embodiments of the method that include coating the internal diamond surfaces of the PCD body in the masked or passivated region have the advantage that a generally porous microstructure may be retained. This may allow for infiltration of infiltrant material into the porous microstructure whilst keeping catalyst material isolated from the thermally stable region. This may preserve the thermal stability of at least part of the PCD body.

Embodiments of the method of the invention have the advantage that the nature and type of carbide substrate used in the final product may be different from that used in the manufacture of the starting PCD body. This may permit the use of a substrate most suitable for sintering the starting PCD body, and then the use of a different substrate that may be more suitable for the finished product. In other words, the substrate of embodiments of the final product is not limited to that used for sintering the PCD body and may be selected to have better properties for use in a given application.

A third aspect of the invention provides a PCD insert for a tool, the insert comprising an embodiment of a PCD element according to the invention.

A fourth aspect of the invention provides a tool comprising an embodiment of an insert according to an aspect of the invention.

In some embodiments, the tool is for machining, drilling, boring, cutting or otherwise forming or degrading a hard or abrasive workpiece or other body, such as rock, concrete, asphalt, metal or hard composite materials. In some embodiments, the tool is a drill bit for use in earth boring, rock drilling or rock degradation, as may be used in the oil and gas drilling and mining industries. In one embodiment, the tool is a rotary drag bit for use in earth-boring and rock drilling in the oil and gas industry.

A fifth aspect of the invention provides a rotary drill bit containing a plurality of PCD inserts, each comprising a respective embodiment of a PCD element according to the invention.

DRAWING CAPTIONS

Non-limiting embodiments of the invention will now be described in more detail, by way of example only, with reference to the accompanying drawings, of which.

The same references in all drawings refer to the same features, unless otherwise indicated.

DETAILED DESCRIPTION OF EMBODIMENTS

As used herein, a "mask" is a physical barrier that is capable of retarding or preventing diffusion or chemical reactions across it.

As used herein, "mask medium" or "mask material" is a medium or material that is suitable for forming a mask or functioning as a mask.

As used herein, a "passivation medium" is a medium that is capable of retarding or preventing certain chemical reactions or phase transformations, such as the transformation of diamond to graphite.

As used herein, the term "unpassivated or unmasked" in relation to a region of a PCD body means that the region is substantially free of the mask or passivation medium substantially present within a masked or passivated region of the polycrystalline diamond body.

As used herein, the term "interstices" is understood to mean "interstices or interstitial regions". Interstices may be filled or unfilled, or partly filled with a binder or filler material.

Figure 1:
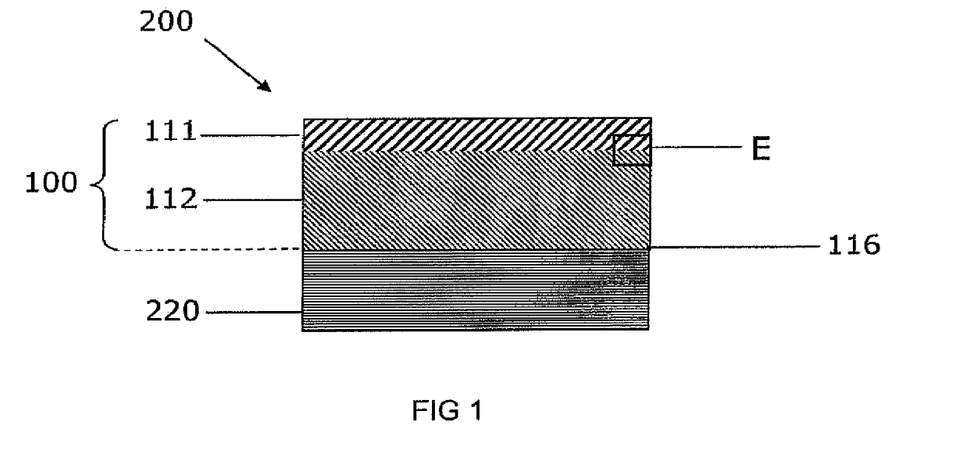
FIG. 1 shows a schematic longitudinal cross sectional view of an embodiment of a PCD element.
Figure 2:
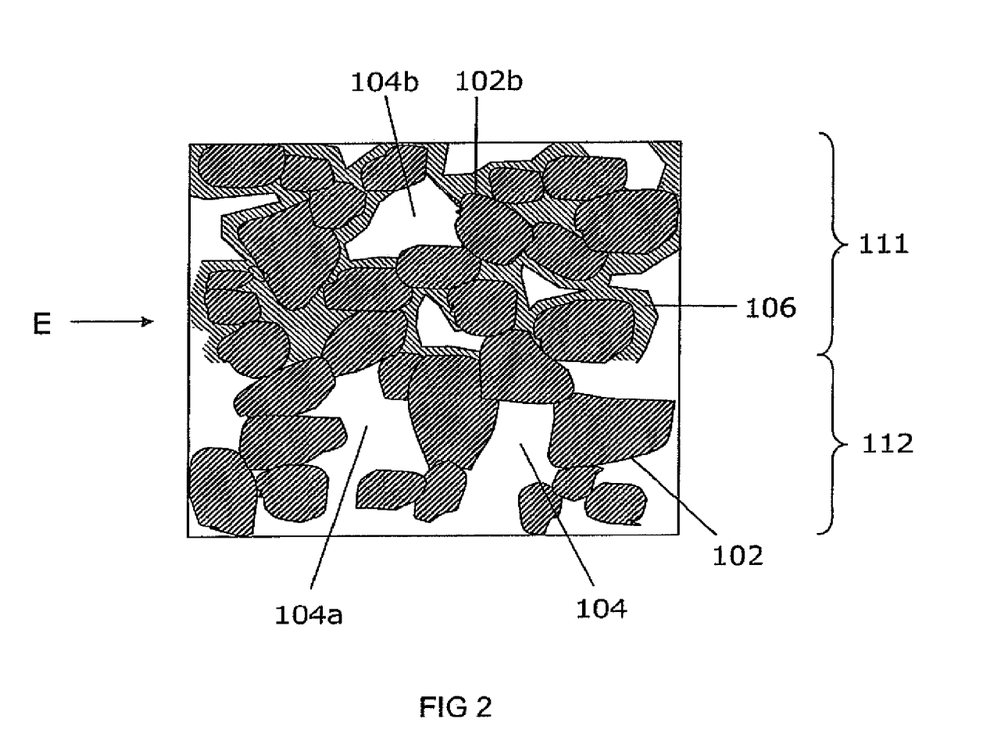
FIG. 2 shows a schematic expanded cross sectional view of a region of the embodiment shown in FIG. 1.

With reference to FIG. 1 and FIG. 2, an embodiment of a PCD insert 200 comprises an embodiment of a PCD element 100 joined to a cemented carbide substrate 220 at an interface 116. The embodiment of the PCD element 100 has internal diamond surfaces 102, the internal diamond surfaces 102 defining interstices 104 between them. The PCD element 100 comprises a masked or passivated region 111 and an unmasked or unpassivated region 112, the unmasked or unpassivated region 112 defining a boundary 116 with the substrate 220, the boundary being the interface (both indicated by reference 116), and extending a depth of between about 5 microns and about 600 microns from the boundary 116, in which at least some of the internal diamond surfaces 102b of the masked or passivated region 111 contact a mask or passivation medium, and wherein some or all of the interstices 104b of the masked or passivated region 111 and of the unmasked or unpassivated region 112 are at least partially filled with an infiltrant material.

With reference to FIG. 3 to FIG. 6, embodiments of PCD elements 100 are joined to cemented carbide substrates 220 to form embodiments of PCD inserts 200 having respective working surfaces 114. The PCD elements 100 each have a respective masked or passivated region 111, wherein the microscopic interstices (not shown) are substantially filled with a mask or passivation medium, and an unmasked or unpassivated region 112, proximate the substrate 220. The embodiments shown in FIG. 3, FIG. 4 and FIG. 5 each comprise a respective further region 113, in which both the mask or passivation medium, or precursor thereof, and the catalyst material are present.

Figure 3:
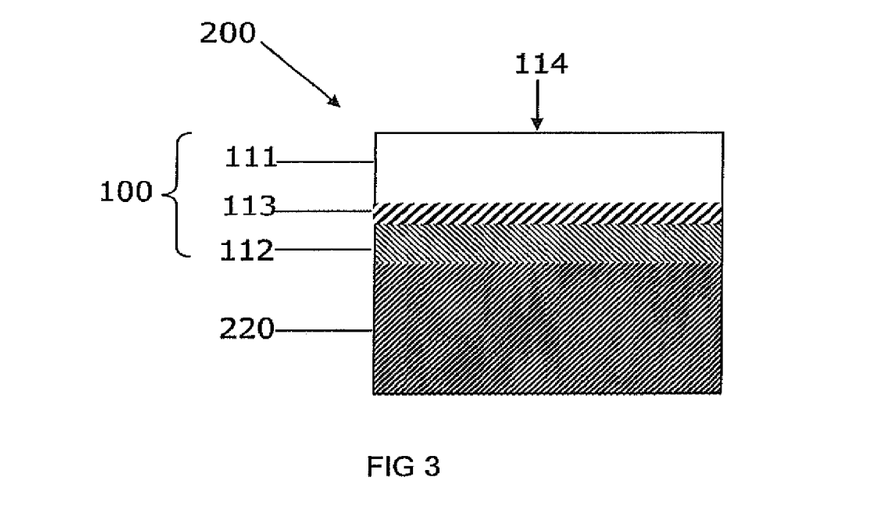
FIG. 3 to FIG. 6 show schematic longitudinal cross sectional views of embodiments of PCD elements.

In the embodiment shown in FIG. 3, the volume of the masked or passivated region 111 is substantially greater than that of the unmasked or unpassivated region 112.

Figure 4:
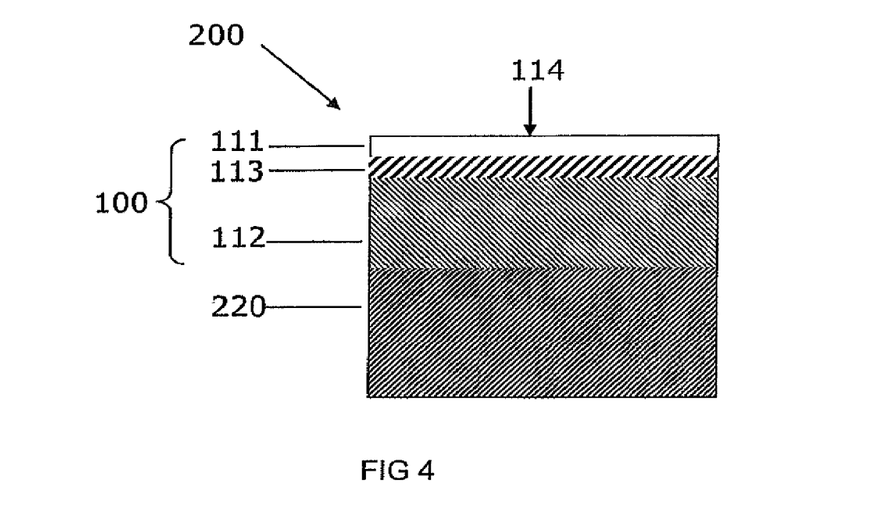

In the embodiment shown in FIG. 4, the volume of the masked or passivated region 111 is substantially smaller than that of the unmasked or unpassivated region 112.

Figure 5:
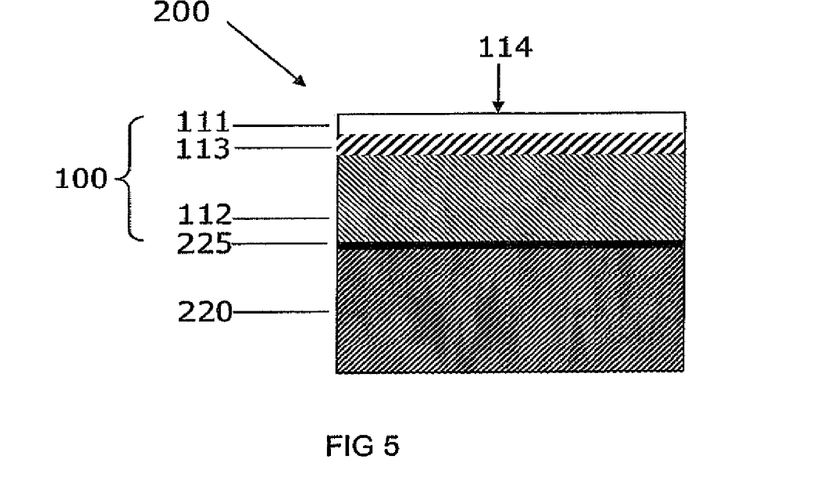

In the embodiment shown in FIG. 5, the PCD element 100 is bonded to the substrate 220 via an intermediate layer 225. The intermediate layer 225 comprises diamond grains, metal carbide and a metal.

Figure 6:
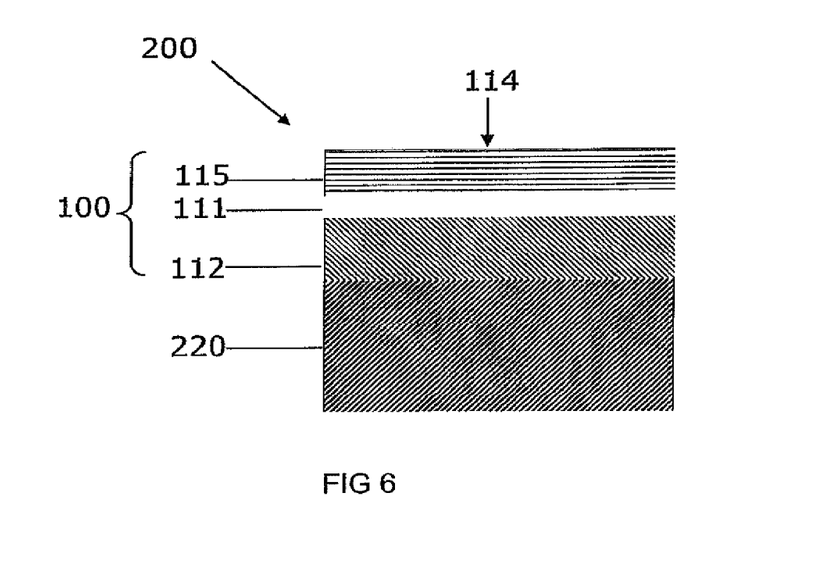

In the embodiment shown in FIG. 6, the PCD element 100 comprises a porous region 115 proximate the working surface 114. The microscopic interstices (not shown) within the porous region 115 are substantially devoid of mask or passivation medium and of catalyst material. The masked or passivated region 111 is located intermediate the porous region 115 and the unmasked or unpassivated region 112.

Embodiments of PCD elements or inserts of the invention may have particular application as cutter elements for drill bits, in which applications the enhanced thermal stability may extend the working life of the tool.

As used herein, a catalyst material for diamond is a material that is capable of promoting the precipitation, growth and/or sintering-together of grains of diamond under a condition of pressure and temperature at which diamond is more thermodynamically stable than graphite. Examples of catalyst materials for diamond are iron, nickel, cobalt, manganese and certain alloys including any of these elements. Some catalyst materials for diamond are capable of promoting the conversion of diamond into graphite at ambient pressure, particularly at elevated temperatures.

As used herein, "thermally stable" when used in relation to a PCD body or element or region therein is understood to mean that the PCD within that region has enhanced resistance to degradation at elevated temperatures, particularly temperatures in the range from about 400 degrees centigrade to about 800 degrees centigrade. In some embodiments, this may be achieved if less than about 10% of the area of the internal diamond surfaces of the body or portion thereof is in contact with a catalyst material that is capable of promoting the conversion of diamond into graphite at ambient pressure.

In one embodiment, the thermally stable region is adjacent a working surface or periphery, or adjacent a working surface and periphery of the PCD element.

Figure 7A:
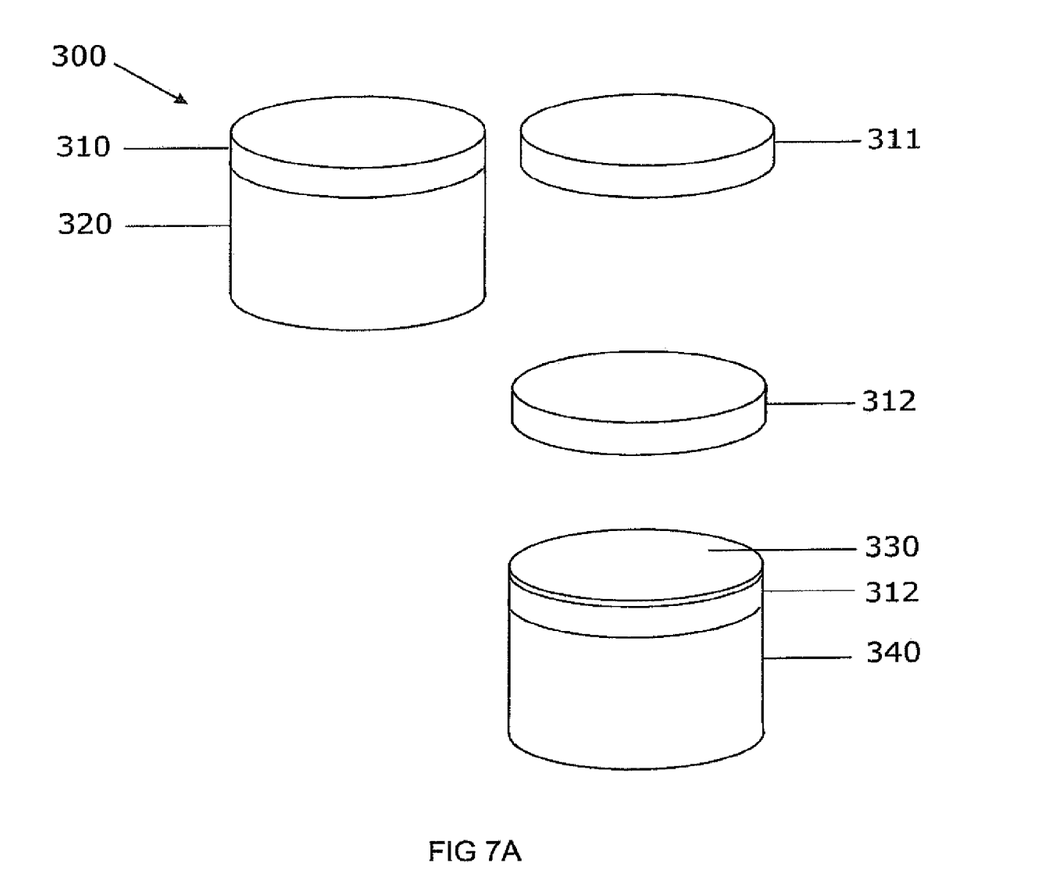
FIG. 7A shows schematic perspective views of components used in an embodiment of a method for manufacturing PCD compacts or inserts.
Figure 7B:
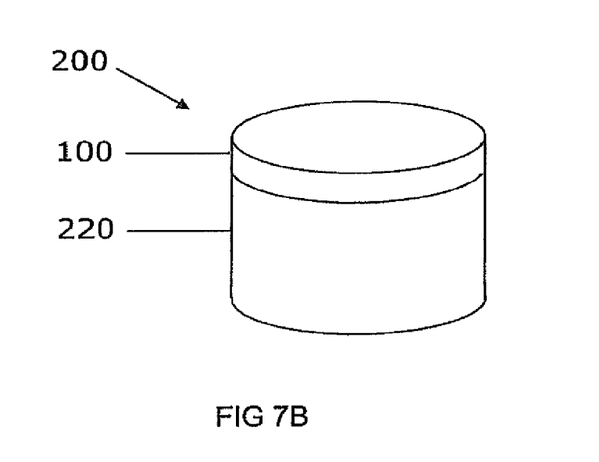
FIG. 7B shows a schematic perspective view of a PCD compact or insert.

With reference to FIG. 7A, an embodiment of a method for making a PCD element includes providing a PCD insert 300 that has been manufactured using an ultra-high pressure and high temperature (HPHT) method well-known in the art. The insert 300 comprises a PCD element 310 integrally bonded to a cemented carbide hard-metal substrate 320. The microscopic interstices (not shown) of the PCD element 310 are substantially filled with cobalt catalyst material. At least a part of PCD element 310 is detached from the insert 300 to produce a PCD body 311. One way of detaching the PCD element 310 is to grind away the substrate 320. The PCD body 311 is treated to remove catalyst material from the interstices to produce a porous and thermally stable PCD element 312. The porous PCD element 312 is then contacted on one side with a second cemented carbide substrate 340 and on the opposite side with a source 330 of mask or passivation medium, or a precursor for a mask or passivation medium. The source 330 may be in the form of a thin foil or disc, or powder. The substrate 340 includes tungsten carbide grains and a cobalt metal binder, the metal binder being capable of acting as a catalyst material to promote the growth and sintering of diamond grains. The porous PCD element 312, thus "sandwiched" between the substrate 340 and the foil or disc 330 is treated at an ultra-high pressure in excess of about 5 GPa at temperatures sufficiently high to melt the mask or passivation medium or its precursor and to melt the cobalt metal binder of the substrate 340, resulting in some of it infiltrating as an infiltrant material into the porous PCD element 312. The temperature cycle may be controlled in such a manner as to allow sufficient or a certain amount of the mask or passivation medium or its precursor to be introduced into the porous PCD element 312 prior to the cobalt metal binder material melting and infiltrating into the porous PCD element 312. After this treatment, the resulting insert is removed and processed to final dimensions and tolerances to produce an embodiment of a finished PCD insert 200 shown in FIG. 7B, comprising a PCD element 100 joined to a cemented carbide substrate 220.

One embodiment of the method of the invention includes contacting the PCD body with a source of mask or passivation medium, or of a mask or passivation precursor material, and with a source of infiltrant material. In one embodiment, the PCD body has a thickness between a pair of opposite surfaces of at least about 1.5 mm or at least about 1.8 mm, one of the pair contacted with a source of mask or passivation medium, or of a mask or passivation precursor material, and the other of the pair contacted with a source of infiltrant material.

One embodiment of the method of the invention includes heating a source of mask or passivation medium, or of a mask or passivation precursor material, to a temperature within the range between the melting point of the mask or passivation medium, or the mask or passivation precursor material, and the melting point of the infiltrant material, maintaining the temperature within this range for a period of time sufficient for the introduction of the mask or passivation medium, or the mask or passivation precursor material, to be completed. In one embodiment, the temperature is then increased to greater than the melting point of the infiltrant material for a period of time for the introduction of the infiltrant material to be completed.

One embodiment of the method includes contacting one surface of a porous PCD body with a source of silicon, contacting another surface of the PCD body with a source of cobalt to form an assembly, subjecting the assembly to a pressure of at least about 5.5 GPa, heating the assembly to a temperature in the range above the melting point of silicon at the pressure and below the melting point of cobalt at the pressure, maintaining temperature within this range for a period of time of at least about 2 minutes or at least about 3 minutes, and then increasing the temperature to above the melting point of cobalt at the pressure.

One embodiment of the method includes contacting one surface of a porous PCD body with a source of aluminium, contacting another surface of the PCD body with a source of cobalt to form an assembly, subjecting the assembly to a pressure of at least about 5.5 GPa, heating the assembly to a temperature in the range above the melting point of aluminium at the pressure and below the melting point of cobalt at the pressure, maintaining temperature within this range for a period of time of at least about 1 minute or at least about 2 minutes, and then increasing the temperature to above the melting point of cobalt at the pressure.

In some embodiments, the period of time is at most about 15 minutes or even at most about 10 minutes.

The sintered PCD body can be produced in an ultra-high pressure furnace by sintering together diamond grains in the presence of a catalyst material for diamond at a pressure of at least about 5.5 GPa and a temperature of at least about 1,300 degrees centigrade. The catalyst material may comprise a conventional transition metal type diamond catalyst material, such as cobalt, iron or nickel, or certain alloys thereof. The sintered PCD body, as a whole or at least a region thereof, may then be rendered thermally stable, for example, through the removal of the majority of binder catalyst material from the PCD body or desired region using acid leaching or another similar process known in the art.

The catalyst material present in the PCD body 311 may be removed by any of various methods known in the art, such as electrolytic etching, evaporation techniques, acid leaching (for example by immersion in a liquor containing hydrofluoric acid, nitric acid or mixtures thereof) or by means of chlorine gas, as disclosed in international patent publication number WO2007/042920, or by another method (e.g. as disclosed in South African patent number 2006/00378).

In one embodiment of the method, two porous PCD bodies, similar to the porous element 312 in FIG. 7A are provided. One of the porous PCD bodies is infiltrated or permeated with a precursor for a mask or passivation medium. Preferably, the precursor is a metal that, when in the molten or gas phase, readily reacts with carbon to form a carbide. The precursor may be introduced into the pores of the porous PCD body by contacting a body of the precursor material with the PCD element and heating in a vacuum or inert atmosphere to a temperature above the melting point of the precursor, and allowing the molten precursor to infiltrate into the porous PCD body. If the precursor is a good carbide former (e.g. Si or Ti), then it may react with carbon from the diamond to form a carbide mask or passivation medium. The resulting masked or passivated PCD body is then placed in contact with the other porous PCD body, which in turn is placed in contact with a hard-metal substrate containing a source of catalyst material such as cobalt. The porous PCD body, thus "sandwiched" between the hard-metal substrate and the masked or passivated PCD element, is treated at an ultra-high pressure in excess of about 5 GPa at a temperature sufficiently high to melt the metal binder of the substrate, resulting in some of it infiltrating into the porous PCD element. After this treatment, the resulting insert is removed and processed to final dimensions and tolerances to produce a finished PCD insert.

In one embodiment of the method, a PCD insert similar to PCD insert 300 in FIG. 7A, is provided. A region proximate the working surface of the PCD element is depleted substantially of catalyst material by means of a method known in the art, resulting in the region being porous. A mask or passivation medium, or precursor for a mask or passivation medium, is introduced into the pores of the porous region to form a coating on the internal diamond surfaces.

For example, the medium or its precursor may be introduced in vapour form in order to coat as much as possible of the diamond surface area, even substantially all of the diamond surface area, with a thin protective coating of the mask or passivation medium. The parameters of the method of introduction may be controlled to retain porosity within the region, the average pore volume having been reduced by the volume of the deposited mask or passivation medium coat. A catalyst material is then infiltrated into the remaining pores of the masked or passivated region. This may be done by contacting a source of catalyst material with the working surface of the PCD element, assembling the PCD insert and the source into a capsule of a kind used for HPHT sintering of PCD, and subjecting the assembly to an ultra-high pressure and temperature at which the catalyst material is molten and the diamond is thermodynamically more stable than graphite. In some embodiment, the pressure is at least about 5.5 GPa, at least about 6 GPa or at least about 6.5 GPa. In one embodiment, the pressure is about 6.8 GPa.

The introduction of a mask or passivation medium or a precursor thereof may be complete, in that the majority of the open porosity of the masked or passivated region of the PCD body is filled or rendered largely non-porous by the introduction of a further phase or phases, hence blocking infiltration; or it may be partial, in that only the exposed surfaces of the diamond microstructure are masked or passivated, with significant volume-based porosity remaining, but resulting in an intergrown diamond skeleton or microstructure that is largely isolated from chemical and physical interaction with the infiltrant or bonding material front.

The mask or passivation medium may be removable, for example by some suitable chemical treatment before use in the final compact, or if inert or even beneficial can be left within the product.

Various methods of introducing mask or passivation media or their precursors may be used. These include using a gas phase of, for instance, Ti, Si, W and the like, to coat the PCD material in the region or regions thereof that are required to be free of infiltrant material. Alternatively, pores or voids of the structure can be filled, either wholly or partially, with an inert salt or ceramic phase. Suitable salts or ceramics may be those which do not melt at HPHT conditions, or undergo significant phase changes that could compromise the structural integrity of the PCD skeleton. A further approach involving treatment of the internal surfaces of the porosity using a surface chemistry modification such that chemical wetting by the infiltrant front is prevented or hindered, is also anticipated.

Non-limiting examples of technologies for introducing mask or passivation media into the porosity of the diamond skeleton include:

Atomic Layer Deposition (ALD) to coat the internal diamond surfaces of the open porosity;

infiltration with a liquid pre-ceramic polymer or polymer solution that is subsequently converted to a ceramic phase through a process of curing and subsequent ceramitisation;

use of sol gel routes or other solution-based chemical routes to deposit or form suitable phases in the porosity of the PCD, which may require subsequent heat and/or gas treatments to achieve the desired phases.

Atomic Layer Deposition (ALD) may form extremely homogeneous coatings on surfaces which, as a result, are very good barrier layers, even for only a few (for example 25) atomic layers. In addition, the chemistry can be controlled layer by layer, allowing multifunctional coatings to be easily applied. ALD may have advantages over other thin film deposition techniques because ALD grown films are substantially conformal with the coated body, pin-hole free and chemically bonded to the coated body. With ALD it is possible to deposit coatings uniform in thickness inside deep trenches, porous media and around particles. Such an ALD coating method is disclosed, for example, in United States patent publication number 2008/0073127.

A further example alternative approach to introducing a mask or passivation medium into a porous region within a PCD element is to infiltrate a preceramic polymer, or other suitable organometallic precursor material, into the pores (see, for example, U.S. Pat. Nos. 5,649,984 and 5,690,706, and the references cited therein, for background information). Liquid pre-ceramic polymers exist that can be converted to ceramics through a process of curing and subsequent cerametisation. In particular, certain Si—C—N liquid preceramic polymer systems may be most suitable for infiltration into porous PCD bodies and subsequent treatment, as is known in the art, to convert the polymer into a ceramic material, particularly silicon carbo-nitride, as is also well known in the art. Infiltration of a preceramic polymer into porous PCD is advantageously carried out in vacuum and assisted by the application of an elevated temperature and/or pressure of less than about 30 MPa.

Another method for introducing mask or passivation material into a porous region within a PCD element includes a sol gel method (see, for example, the approach for depositing metal carbide onto diamond disclosed in WO2006/032982, and coating methods as described in WO2006/032984 and WO2007/088461). In a particular embodiment, an inert salt such as $CaCo_3$, for example, is infiltrated into the porous PCD element by means of a sol gel approach. The inert salt functions to limit the subsequent infiltration of catalyst material at an ultra-high pressure and temperature, resulting in a region of the PCD wherein the pores are substantially filled with the salt and a second region wherein the pores are substantially filled with a catalyst material. The salt may readily be removed from the PCD element after the reinfiltration step by means of dissolution in water, leaving a porous region within the PCD.

Other methods may be used to introduce a mask or passivation medium into a porous PCD body. In an example embodiment of one such alternative approach, a porous PCD element may be infiltrated or permeated with a vapour of tungsten hexafluoride, resulting in the deposition of tungsten within the pores. At least some of the tungsten may react with carbon from the diamond to form WC, which is a suitable passivation medium. Since unreacted tungsten is also a suitable mask or passivation medium, the formation of WC would not be essential. Methods known in the art of diamond coatings and metallization may be used (see, for example, U.S. Pat. Nos. 7,022,403; 5,346,719; 5,062,865; and 5,062,865). Vapour deposition approaches may similarly be used for introducing Si, Cr or Ti into the interstices of a porous PCD element, resulting in a carbide, nitride, boride, carbo-nitride or boro-nitride of silicon, chromium or titanium at least partially coating the diamond surfaces. Such methods are well known in the art of diamond coating by means of physical vapour deposition (PVD) and chemical vapour deposition (CVD). See, for example, WO2005/078041, U.S. Pat. Nos. 5,024,680 and 5,221,969, and European patent number EP 0 467 404, which are incorporated herein by reference.

In one example embodiment, the porosity may be filled wholly or partly with a non-diamond carbon containing material. This may, in the presence of catalyst material be converted to PCD during a subsequent step of subjecting the PCD body to an ultra high pressure, resulting in increased diamond density in the outer portion of the PCD layer and hence increased thermal stability. Infiltration with a carbon-containing material may be accomplished by chemical vapour infiltration of amorphous graphitic carbon supplied at low pressure using gaseous hydrocarbons including methane, ethane or ethylene. Infiltration may also be achieved by liquid phase infiltration at high pressure using liquid hydrocarbons, including wax, pitch and bitumen or by impregnation with carbon at high pressure using fullerenes.

In a further example embodiment, an intermediate layer may be provided, for example between the substrate and the PCD body. The function of the intermediate layer may be primarily to reduce internal stresses within the PCD element and therefore minimise the risk of fracture. Such intermediate layers are well known in the art and various intermediate layers for PCD inserts have been disclosed (e.g. U.S. Pat. No. 5,370,195 and US patent publication number US 2007-0186483 A1).

The mask or passivation process may be conducted in such a manner as to leave or render porous a region adjacent the substrate or support surface to ensure optimal bonding during the HPHT bonding step.

The masked or passivated region may be formed between the thermally stable region and the porous region adjacent the substrate or support region, provided it acts as a barrier to any bonding phase infiltrating from the substrate or support, preventing it from contacting or interacting in any way with the thermally stable region.

A region adjacent a peripheral surface of the PCD element may be treated to form a thermally stable annular region substantially free of catalyst material. In an alternative example embodiment, the passivated or masked region could be located intermediate the thermally stable region, adjacent the working surface and/or periphery, and the porous region adjacent the surface to be attached to the substrate. The various regions are typically provided in layer form.

Preferably, the mask or passivation step will not be carried out under HPHT conditions, and will therefore constitute a separate treatment of the porous PCD body under moderate temperature and pressure conditions before it is bonded to the substrate or support body.

In one example embodiment of the method of the invention, the attachment or bonding of a previously sintered or intergrown thermally stable PCD body having substantial diamond-to-diamond bonding in its microstructure to a suitable support, such as a cemented carbide substrate, is provided in such a way as to maintain or preserve the thermal stability of the PCD, particularly at the upper working surface of the resultant abrasive element. Hence the need for any subsequent treatment or modification of the PCD body in order to improve or attain final thermal stability of the region adjacent the working surface or periphery may be removed or significantly reduced. In use, PCD elements may be exposed to elevated temperatures due to friction events at the working or outer surface. Hence, it is typically in this region that thermal stability must be preserved.

The provision of a degree of porosity in the PCD body may assist in facilitating the bonding of the PCD body to the substrate. Porosity in a region of the PCD that will contact the substrate may allow better bonding between the substrate and the PCD body because of infiltration of the cementing phase or another suitable bonding phase from the substrate body or the interface region into the PCD body. While wishing not to be bound by a particular hypothesis, the porosity may facilitate a capillary action which may draw the bonding phase into the PCD microstructure and maximise the strength of the bond between the two bodies during the attachment process.

The person skilled in the art will appreciate that PCD elements and inserts of a wide range of shapes and sizes can be made, depending on the type of application. The inserts may be particularly advantageous when used in applications where the insert may be subjected to high temperatures, and therefore where high thermal stability is important. One such use is for rotary drill bits used for rock drilling and earth boring in the oil and gas industry.

Figure 8:
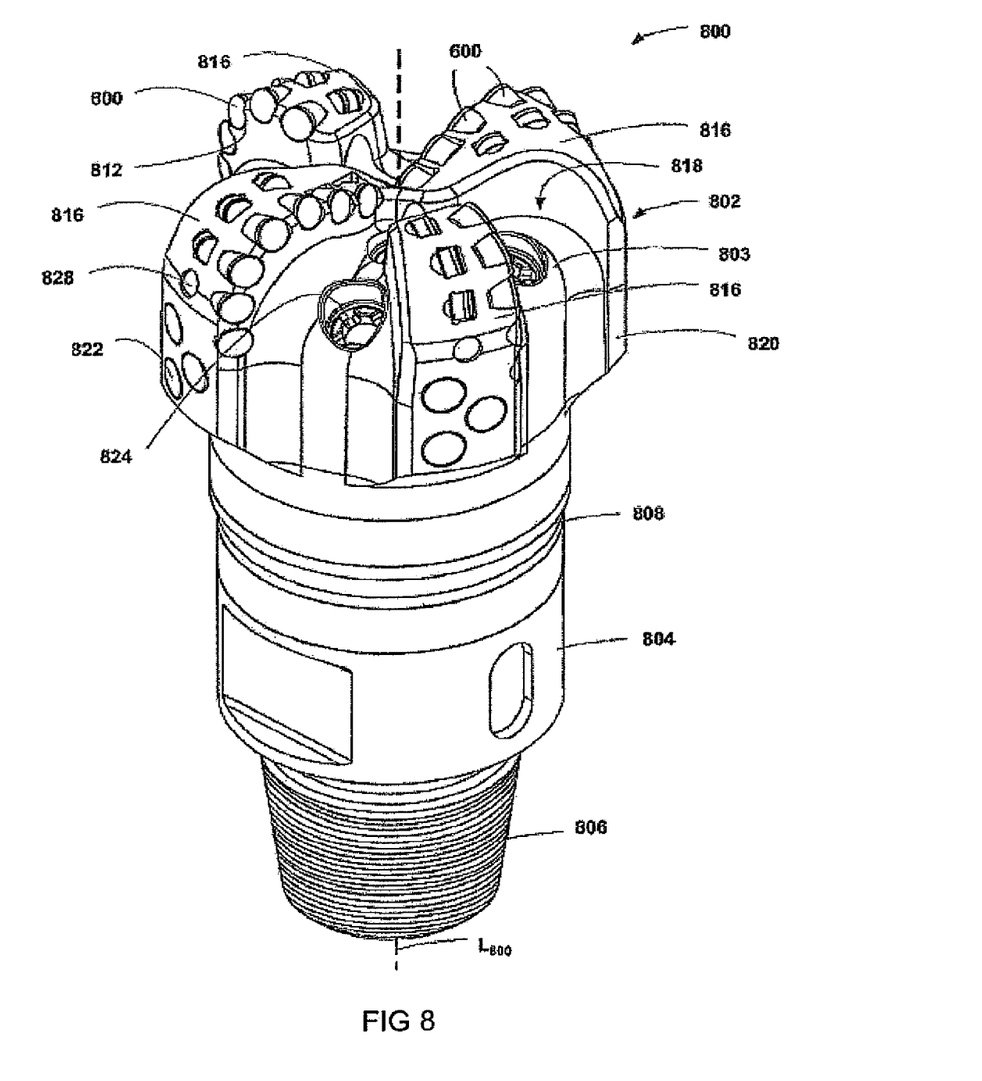
FIG. 8 shows a perspective view of a rotary drill bit for boring into the earth.

With reference to FIG. 8, an embodiment of an earth-boring rotary drill bit 800 includes, for example, a plurality of PCD inserts 600 as previously described herein with reference to FIG. 1. The earth-boring rotary drill bit 800 includes a bit body 802 that is secured to a shank 804 having a threaded connection portion 806 (e.g., a threaded connection portion 806 conforming to industry standards such as those promulgated by the American Petroleum Institute (API)) for attaching the drill bit 800 to a drill string (not shown). The bit body 802 may comprise a particle-matrix composite material or a metal alloy such as steel. The bit body 802 may be secured to the shank 804 by one or more of a threaded connection, a weld, and a braze alloy at the interface between them. In some embodiments, the bit body 802 may be secured to the shank, 804, indirectly by way of a metal blank or extension between them, as known in the art.

The bit body 802 may include internal fluid passageways (not shown) that extend between the face 803 of the bit body 802 and a longitudinal bore (not shown), which extends through the shank 804, an extension 808 and partially through the bit body 802. Nozzle inserts 824 also may be provided at the face 803 of the bit body 802 within the internal fluid passageways. The bit body 802 may further include a plurality of blades 816 that are separated by junk slots 818. In some embodiments, the bit body 802 may include gage wear plugs 822 and wear knots 828. A plurality of PCD inserts, which are generally indicated by reference numeral 600 in FIG. 8, may be mounted on the face 803 of the bit body 802 in cutting element pockets 812 that are located along each of the blades 816.

The inserts 600 are positioned to cut a subterranean formation being drilled while the drill bit, 800, is rotated under weight on bit (WOB) in a bore hole about centreline, L800.

Embodiments of PDC inserts of the present invention may also be used as gauge trimmers, and may be used on other types of earth-boring tools. For example, embodiments of inserts of the present invention may also be used on cones of roller cone drill bits, on reamers, mills, bi-centre bits, eccentric bits, coring bits, and so-called hybrid bits that include both fixed cutters and rolling cutters.

EXAMPLES

The invention will now be described, by way of example only, with reference to the following non-limiting examples.

Example 1

A PCD insert suitable for use on a rotary bit for oil and gas drilling and having a diameter of about 16 mm was provided. The insert was substantially cylindrical in shape and comprised a PCD layer integrally bonded to a Co-cemented WC substrate. The PCD layer was about 2.3 mm thick and comprised sintered diamond grains with an average grain size of less than about 20 microns and with a grain size distribution which was capable of being resolved into at least three distinct peaks, or modes. The interstices between the diamond grains of the PCD were filled with Co, a catalyst material sourced from the hard-metal substrate during the step of sintering the PCD. The PCD layer was detached from the substrate by means of wire EDM (electro-discharge machining), providing a PCD body having a generally disc-like shape. Substantially all of the Co was then removed from the PCD body by immersing it in a mixture of hydrofluoric and nitric acid for several days, resulting in a porous, detached PCD body. The porous PCD body was heat treated in vacuum in order to remove (i.e. "outgas") any residual organic impurities that may have been present.

The porous PCD body was placed onto a flat surface of another cylindrical substrate comprising cobalt-cemented tungsten carbide, and a thin disc of silicon placed on top of the porous PCD disc, and this assembly was loaded into a capsule for an ultra-high pressure furnace (or high temperature press). Although a disc of silicon was used in this example, a layer of silicon powder could be used. The silicon disc was less than 1 mm thick and had been ultrasonically cleaned in an acetone bath. The assembly was subjected to an ultra-high pressure of greater than about 5.5 GPa, at which diamond is thermodynamically stable. The temperature was increased to about 1,220 degrees centigrade, which was greater than the melting point of silicon at the pressure, and maintained between this temperature and about 1,320 degrees centigrade, which is approximately the melting point of cobalt at the pressure, for a period of 3 minutes. This period had been determined by experimentation to be sufficient for the silicon to melt and infiltrate into the PCD body to a depth from the substrate of greater than about 100 microns and less than about 400 microns. The temperature was then increased to about 1,400 degrees centigrade and maintained at this level for about 5 minutes. In this way, the porous PCD body was re-infiltrated to a depth of between 100 and 400 microns with molten cobalt from the substrate and molten silicon from the opposite surface, and simultaneously bonded to the substrate.

After the re-infiltration step, the insert was recovered and sliced into two parts along an axial plane, producing two cross-sectional surfaces. One of these surfaces was polished and analysed by means of SEM (scanning electron microscopy). It was found that the silicon had infiltrated the PCD to a depth of several hundred microns and substantially all had reacted with carbon from the diamond to form SiC. The interstices near the side of the PCD bonded to the substrate were substantially filled with Co, which had infiltrated from the substrate, and there was a layer between the silicon-rich and the cobalt-rich layers in which the interstices were substantially filled with both Co and Si. Further analysis revealed that cobalt disilicide was present within the intermediate layer.

Example 2

A porous PCD body can be prepared as in Example 1 and silicon can be introduced into some of the pores prior to the treatment at ultra-high pressure. This can be done by placing the porous PCD disc into a graphite vessel and disposing a silicon foil on top of it, the silicon foil having been ultrasonically cleaned in an acetone bath. The vessel can be placed in a furnace and its contents heated in a vacuum to about 1,550° C., causing the silicon foil to melt and infiltrate the PCD disc. When the PCD body is removed from the furnace after re-infiltration, it is anticipated that the interstices will be filled with silicon carbide and a minor amount of unreacted silicon to a depth of about 200 microns.

Such a partially infiltrated PCD body can be placed onto a cobalt-cemented tungsten carbide substrate, with the non-infiltrated side (i.e. the side of the PCD on which the interstices are substantially empty and the PCD body is porous) in contact with a surface of the substrate. This assembly of PCD disc and substrate can then be subjected to an ultra-high pressure of greater than about 5.5 GPa and a temperature of greater than about 1,500° C. to produce a PCD insert.

Example 3

A porous PCD body can be prepared as in Example 1 and silicon can be introduced into some of the pores prior to the treatment at ultra-high pressure. Only a very thin film of silicon can be deposited onto a flat surface of the PCD disc by means of sputtering. The mass of the silicon deposited should be calculated to be just sufficient for 10% of the pores to be filled with silicon carbide, and consequently to provide just enough silicon to infiltrate the PCD to a depth of about 10% of its thickness, i.e. to a depth of about 230 microns from the flat surface, leaving the remaining pores substantially empty. This mass, when calculated, will typically be about 12 milligrams, providing a film of about 23 microns thick, the film thickness being as uniform as possible across the PCD surface.

The silicon-coated PCD can then be placed into a graphite vessel, with the coated surface remote from the base of the graphite vessel (i.e. on the top surface), and the vessel then placed into a furnace. The vessel and its contents are to be heated in a vacuum to 1,550° C., this temperature being above the melting point of silicon, to produce a PCD insert.

Example 4

A porous PCD body was prepared as described in Example 1. The porous PCD body was placed onto a flat surface of a cylindrical substrate comprising cobalt-cemented tungsten carbide, and a layer of aluminium powder was introduced on top of the porous PCD disc. The layer of aluminium powder had a mass of about 135 mg and the mean size of the powder was in the range of about 5 microns to 20 microns. Although aluminium powder was used in this example, an aluminium disc or foil could also be used. The mass of the aluminium powder was estimated to correspond to a fully dense volume of aluminium equivalent to about 10 percent of the volume of the PCD body. This assembly was loaded into a capsule for an ultra-high pressure furnace (or high temperature press). The aluminium layer was less than about 1 mm thick. The assembly was subjected to an ultra-high pressure of greater than about 5.5 GPa, at which diamond is thermodynamically stable. The temperature was increased to about 900 degrees centigrade, which was greater than the melting point of aluminium at the pressure, and maintained between this temperature and about 1,330 degrees centigrade, which was the melting point of cobalt at the pressure, for a period of 1 minute. This period had been determined by experimentation to be sufficient for the aluminium to melt and infiltrate into the PCD body to a depth from the substrate of greater than about 100 microns and less than about 400 microns. The temperature was then increased to about 1,500 degrees centigrade and maintained at this level for about 5 minutes. In this way, the porous PCD body was re-infiltrated to a depth of between 100 and 400 microns with molten cobalt from the substrate and molten aluminium from the opposite surface, and simultaneously bonded to the substrate.

After the re-infiltration step, the insert was recovered and sliced into two parts along an axial plane, producing two cross-sectional surfaces. One of these surfaces was polished and analysed by means of SEM (scanning electron microscopy), revealing that the PCD had bonded well with the substrate. Further analysis by means of energy dispersive spectroscopy (EDS) and other techniques revealed that and that substantially all of the interstices within a region of the PCD further than about 150 microns from the interface with the substrate were filled with aluminium carbide. A minor amount of other aluminium containing compounds and cobalt was observed throughout this region. The PCD interstices within about 150 microns from the substrate were filled principally with cobalt, although some aluminium was evident.

Further test inserts were made as above and subjected to a wear test, which involved using the inserts, suitably prepared as would be appreciated by the skilled person, to mill a granite block mounted on a vertical turret milling apparatus. The PCD layer displayed excellent wear resistance and thermal stability. As a control, a PCD insert was made using a PCD body that had not been infiltrated with aluminium. The measure of performance in this test was distance of granite cut before the onset of "rubbing", in which the depth of the cut into the granite begins to decrease, indicating decreased cutting effectiveness. This distance was about 750 mm in the case of the control insert and in the range from about 3,500 mm to about 6,200 mm in the case of the test insert.

Example 5

A porous PCD disc can be prepared using the process described in Example 1 and aluminium can be introduced into the pores prior to the treatment at ultra-high pressure. This can be done by placing the porous PCD disc into a graphite vessel, and disposing an aluminium foil on top of it, the aluminium foil having been ultra-sonically cleaned in an acetone bath. The vessel can then be placed in a furnace and its contents heated in a vacuum to above the melting point of aluminium, i.e. to about 900 degrees centigrade, causing the aluminium foil to melt and infiltrate the PCD disc.

Example 6

A porous PCD disc can be prepared using the process described in Example 1 and aluminium can be introduced into the pores prior to the treatment at ultra-high pressure by depositing a very thin film of aluminium onto a flat surface of the PCD disc by means of sputtering. The mass of the aluminium deposited can be calculated to be just sufficient for 10% of the pores to be filled with aluminium carbide, and consequently to provide just enough aluminium to infiltrate the PCD to a depth of about 10% of its thickness, i.e. to a depth of about 230 microns from the flat surface, leaving the remaining pores substantially empty. This mass could be about 14 milligrams, providing a film about 23 microns thick, the film thickness being as uniform as possible across the PCD surface.

The aluminium-coated PCD can be placed into a graphite vessel, with the coated surface remote from the base of the graphite vessel (i.e. on the top surface), and the vessel placed into a furnace. The vessel and its contents can then be heated in a vacuum to 900 degrees centigrade, this temperature being above the melting point of aluminium and one at which aluminium carbide forms readily when in contact with a source of carbon. This would result in the masked PCD body having a stratum of about 230 microns thick comprising aluminium carbide in the interstices.

The masked PCD body can then be assembled into a capsule, the end of the PCD body opposite the stratum being in contact with a cobalt cemented carbide substrate, or other source of cobalt, and subjected to a pressure of at least about 5.5 GPa and a temperature of at least about 1,350 degrees centigrade. Cobalt would infiltrate from the source into the porous region of the PCD but not into the stratum containing the aluminium carbide, resulting in a thermally stable PCD element.

The invention claimed is:

1. A method for manufacturing a PCD element; the method including providing a PCD body having internal diamond surfaces, the internal diamond surfaces defining interstices, the PCD body containing a thermally stable porous region in which at least some of the interstices contain at least partly unfilled pores; introducing a mask or passivation medium proximate or into the thermally stable porous region to form a masked or passivated region extending a depth into the PCD element from a working surface of at least 100 microns; the PCD body further comprising an unmasked or unpassivated region, the unmasked or unpassivated region defining a boundary with another region or body and extending a depth of between about 5 microns and about 600 microns from the boundary; the method further comprising the steps of introducing at least one infiltrant material into the thermally stable porous region, the mask or passivation medium at least partly isolating diamond of the thermally stable porous region from chemical interaction with the at least one infiltrant material, wherein a controlled temperature cycle is employed in such a manner as to allow sufficient or a certain amount of the mask or passivation medium or its precursor to be introduced proximate or into the thermally stable porous region prior to the at least one infiltrant material melting and infiltrating into the thermally stable porous region.

2. A method as claimed in claim 1, the method including coating some or all of the internal diamond surfaces of the thermally stable porous region, at least partially, with a mask or passivation medium.

3. A method as claimed in claim 1, the method including chemically isolating diamond from chemical interaction with the infiltrant material.

4. A method as claimed in claim 1, in which the PCD body is porous throughout.

5. A method as claimed in claim 1, the method including introducing the mask or passivation medium under HPHT conditions.

6. A method as claimed in claim 1, the method including introducing the mask or passivation medium proximate or into the thermally stable porous region under conditions other than HPHT conditions.

7. A method as claimed in claim 6, the method including introducing the mask or passivation medium in a gas or vapour phase, as an inert salt or ceramic phase, or using surface chemistry modification of the internal diamond surfaces in the masked or passivated region.

8. A method as claimed in claim 7, the method including introducing the mask or passivation medium by atomic layer deposition, infiltration with a liquid pre-ceramic polymer or polymer solution, using a sol gel or other solution-based chemical route, or a vapour comprising a metal composition.

9. A method as claimed in claim 8, the method including introducing tungsten hexafluoride as a vapour, thereby to deposit tungsten as the mask or passivation medium.

10. A method as claimed in claim 1, the method including introducing the infiltrant material into a volume of the PCD body, the volume being at least about 10 percent of the total volume of the PCD body.

11. A method as claimed in claim 1, in which the masked or passivated region defines a barrier between the thermally stable region and the infiltrant material.

\* \* \* \* \*